May 8, 1962 H. A. BEASLEY 3,033,933

PARTY-LINE ARRANGEMENTS FOR AUTOMATIC TELEPHONE SWITCHING SYSTEMS

Filed Nov. 19, 1958

3 Sheets-Sheet 1

INVENTOR
HAROLD ARTHUR BEASLEY

BY Irwin S. Thompson
ATTORNEY

May 8, 1962
H. A. BEASLEY
3,033,933
PARTY-LINE ARRANGEMENTS FOR AUTOMATIC TELEPHONE SWITCHING SYSTEMS
Filed Nov. 19, 1958
3 Sheets-Sheet 2

INVENTOR
HAROLD ARTHUR BEASLEY
BY Irwin S. Thompson
ATTORNEY

May 8, 1962 H. A. BEASLEY 3,033,933

PARTY-LINE ARRANGEMENTS FOR AUTOMATIC TELEPHONE SWITCHING SYSTEMS

Filed Nov. 19, 1958 3 Sheets-Sheet 3

INVENTOR
HAROLD ARTHUR BEASLEY

BY Irwin S. Thompson

ATTORNEY

United States Patent Office 3,033,933
Patented May 8, 1962

3,033,933

PARTY-LINE ARRANGEMENTS FOR AUTOMATIC TELEPHONE SWITCHING SYSTEMS

Harold Arthur Beasley, Liverpool, England, assignor to Automatic Telephone & Electric Company Limited, Liverpool, England, a British company Filed Nov. 19, 1958, Ser. No. 774,893
Claims priority, application Great Britain Dec. 13, 1957
4 Claims. (Cl. 179—17)

The present invention relates to automatic telephone switching systems and is more particularly concerned with party-line arrangements included in such systems.

In automatic telephone switching systems having party-line arrangements provision may be made to effect selective metering of calls, made by different subscribers on the party-line, on meters located at a main exchange. When selective metering is provided, each party-line subscriber is allocated a characteristic code or signal which must be transmitted automatically to the exchange equipment prior to or during the setting-up of a connection by a party-line subscriber. It is of course necessary in a selective metering arrangement for party-line subscribers virtually to eliminate the possibility of a subscriber simulating the characteristic code or signal of another subscriber in order to avoid the correct charging and metering of a call.

Various arrangements providing selective metering are known, for example, the dial switch may be so arranged that on the dialling of a prescribed preliminary digit, which is the same for all party-line subscribers, the characteristic code or signal identifying a calling party-line subscriber is automatically transmitted over the party-line conductors to the exchange equipment. The exchange equipment associated with a party-line selects the meter corresponding to a calling subscriber and may be so designed that unless the preliminary digit is dialled, a party-line subscriber is prevented from setting-up a desired connection.

The object of the present invention is to provide simplified arrangements for establishing the identity of a calling station on a party-line.

According to the present invention, in an automatic telephone switching system including subscribers' party-lines and provided with arrangements whereby on a preliminary operation of the dial switch which is the same for all subscribers on the same party-line a characteristic impulse pattern identifying the calling party-line subscriber's station is automatically transmitted over the party-line conductors to exchange equipment, the characteristic impulse pattern is effective on registering means which is incorporated in said exchange equipment and which includes a plurality of coding relays, each characteristic impulse pattern resulting in the operation of a different pair of coding relays to establish the identity of the calling party-line subscriber's station.

Preferably each characteristic impulse pattern comprises a series of three equally-spaced impulsing periods, the number of impulses in the different periods being varied to characterise different subscribers' stations and the occurrence of a space between two impulsing periods enables a particular one of said coding relays to be operated in accordance with the number of impulses in the impulsing period preceding the space.

Further each characteristic impulse pattern comprises the same number of impulses and the registering means includes a device responsive to the total number of impulses in a received impulse pattern to enable a check to be made to ensure that neither more nor less than two coding relays have been operated by any impulse pattern. The operation of a pair of coding relays is effective in preparing a path to the calling subscriber's meter.

In the preferred embodiment of the invention, the device provided in the registering means is a uniselector which has its wipers set to a position corresponding to the total number of impulses received to enable the check to be made and if the check is satisfactory, the uniselector is conditioned to function as a hunting switch providing access to dial-switch-controlled selectors.

Each party line subscriber's station is provided with a telephone instrument embodying a relay device and a dial switch equipped with two sets of impulsing contacts, said relay device being arranged to enable a first set of impulsing contacts to transmit a distinctive impulse pattern for calling-subscriber identification purposes only on the preliminary operation of the dial switch and the circuit arrangement of the telephone instrument is such that upon termination of said impulse pattern the relay is operated to operatively substitute the first set of impulsing contacts by the second set to enable digital impulses to be transmitted by subsequent operation of the dial switch.

The relay device is operated from a current source at the exchange and is of the mechanical-locking type, release of the relay being effected when the instrument handset is replaced upon its rest.

The invention will be better understood from the following description of one embodiment taken in conjunction with the accompanying drawings which in FIG. 1 shows a plan view of the code impulse contacts in relation to the code cam and the main spindle of a dial switch.

Figure 2:
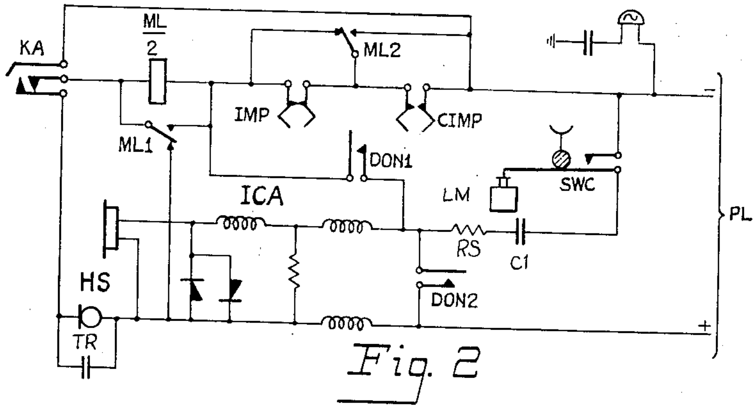
FIG. 2 shows a party-line subscriber's telephone instrument circuit employing code impulse contacts.

The party-line subscriber's telephone instrument circuit shown in FIG. 2 is arranged to be responsive to "leg" ringing signals employing an earth return, although it will be obvious that with simple modifications loop ringing could be readily employed. The "leg" ringing signals may for example be of the coded type, that is, each subscriber has a different code and only answers a call upon hearing his particular code. On the other hand harmonic ringing may be employed, and in this case the bell, in conjunction with the capacitor, is arranged only to be responsive to a particular frequency. Hence if only five ringing codes, or five different harmonically related frequencies are employed, by connecting five subscribers' bells to one "leg" of the party-line and another five subscribers to the other "leg," the same five codes or frequencies can be used in catering for a total of ten party-line subscribers.

The relay ML mounted in the party-line subscriber's telephone instrument cooperates with a latching mechanism LM controlled by the cradle, in which the instrument handset normally rests, so that if the relay is operated electrically at a time when the handset has been removed from the cradle switch the relay is held in its operated position by means of the mechanism until such time as the handset is restored to its rest position. The latching mechanism LM which is indicated diagrammatically in FIG. 2 is fully described in British Patent No. 848,477. The push-button switch KA is operated only in order to answer an incoming call to a party-line subscriber's station. Associated with the push-button is a mechanism controlled from the cradle switch and arranged so that manipulation of the button is prevented while the handset is in its rest position on the cradle switch. This mechanism is also arranged to provide automatic restoration of the push-button, if it has been operated, when the handset is restored to its rest position. In the party-line telephone instrument two sets of impulse contacts are provided, one set (CIMP) being utilised to transmit code impulses which enable the identity of the calling party-line subscriber to be ascertained so that metering conditions may be established and the other set (IMP) being employed in sending digital impulses to effect setting up of a connection.

Figure 1:
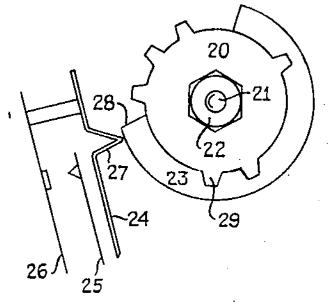

Referring now to FIG. 1, the code cam 20 is provided, by way of example, with the impulse pattern appropriate to party-line subscriber's station number two. The code cam 20 is secured to the screw-threaded upper end of the main shaft 21 of the dial switch and is locked in its correct position by the locking nut 22. Mounted concentrically with, and loosely on, the main shaft 21 is a masking cam 23 which upon operation has a partial rotational movement. Engaging with a portion of the peripheral edge of the masking cam 23 is the contact control arm 24 of the code impulse springs 25 and 26. The mechanism (not shown) for the operation of the masking cam 23 is arranged so that movement of the cam can only be effected on the dialling of digit 0.

When digit 0 is dialled, the dial off-normal contacts (not shown) operate and the code cam 20 is rotated in an anti-clockwise direction with respect to the drawing until the masking cam 23 is moved a short distance in the same direction by its operating mechanism. This movement of the masking cam 23 is sufficient to allow the contact control arm 24 to move by means of its own tension into a position such that one limb 27 of the kinked portion abuts the face 28 of the masking cam 23. In this position the tip of the kinked portion of the control arm 24 just touches the periphery of the code cam 20. The code impulse spring 26 is tensioned so that it follows the movement of the contact control arm 24 in such a manner that contact is made between the two code impulse springs 25 and 26 respectively.

The release of the dial finger plate and consequently its return motion now enables the projections, such as 29, on the code cam 20 to co-operate with the kinked portion of the control arm 24 so that as each projection is encountered the contact between the code impulse springs is broken. It is to be noted that the combined tensions of the control arm 24 and the code impulse spring 26 are such that the kinked portion of the control arm 24 is always in contact with the peripheral edge of the code cam 20 during the return motion of the finger plate. It can thus be seen that the code pattern formed by the projections such as 29 on the code cam 20 are converted to breaks in the contact between the code impulse springs 25 and 26 during the return motion of the dial finger plate.

When the dial finger plate has nearly reached its rest position, the dial off-normal contacts are restored to their rest position in the well-known manner. Thus at this time for a portion of the return motion, the code impulse springs 25 and 26 are still in contact with the dial off-normal contacts restored. When the finger plate has substantially reached its rest position mechanism associated with the masking cam 23 becomes effective once again and this time carries the masking cam to its rest position. This movement of the cam 23 causes the kinked portion of the contact control arm 24 to ride up the face 28 of the masking cam 23 until the tip of the kinked portion rests on the peripheral edge of the cam 23 as shown in the drawing.

The operation of a party-line subscriber's instrument will now be described in more detail. When a party-line subscriber desires to make a call, it is a requirement of the present system that having removed the instrument handset from its rest position, the subscriber must first of all listen to determine if the party-line is idle. The idle condition of the party-line is indicated by dial tone, the listening path being established by way of the cradle switch contacts SWC, capacitor C1, and the anti-sidetone induction coil arrangement designated generally as ICA.

Figure 3:
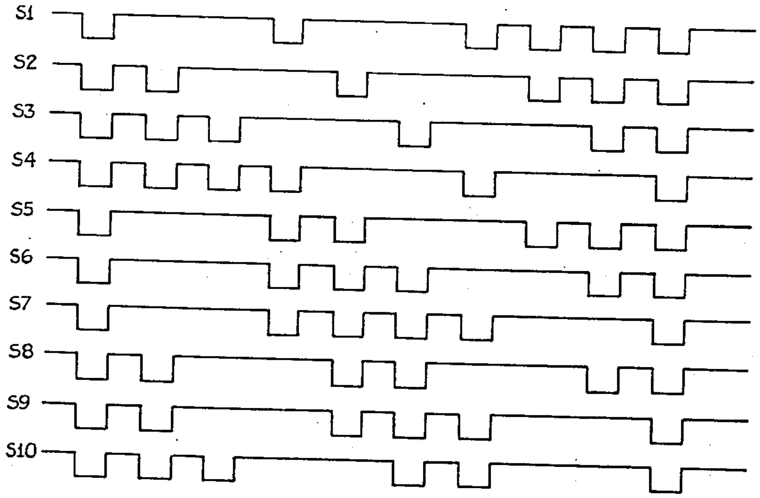
FIG. 3 shows the code pulse patterns appropriate to a party-line having ten subscribers.

Having ascertained that the party-line is idle, as a result of hearing dial tone, the subscriber then proceeds to dial the compulsory preliminary digit, in this case digit 0, and accordingly on rotation of the dial finger plate the dial off-normal contacts DON are operated. Contacts DON1 and DON2 in conjunction apply a short-circuit across the receiver, transmitter and relay ML and also provide a low resistance loop for impulsing purposes. As has been mentioned previously, only on the dialling of the digit 0 will the code impulse springs CIMP be operated, and consequent upon their operation a loop condition is applied to the − and + conductors PL of the party-line to seize the selective metering relay set at the main exchange. The release of the dial finger plate allows the code pattern to be transmitted as disconnections of the loop on the − and + conductors PL. Each subscriber's dial on the party-line transmits a different impulse pattern and these are illustrated in FIG. 3, designations S1 to S10 corresponding to party-line subscribers' stations numbers one to ten respectively. It is to be noted that while impulsing is taking place from a subscriber's instrument, capacitor C1 and resistor RS function as a spark quench on the impulsing contacts.

The code impulse pattern transmitted by the party-line subscriber's dial enables the selective metering relay set to respond so that identity of the calling subscriber's station may be established, this function being fully explained later in the description.

When the dial off-normal contacts DON1 and DON2 restore, the short-circuit is removed from the receiver, transmitter and relay ML. At this time the code impulse springs CIMP are still in an operated or made condition and therefore the relay ML is enabled to operate from the potentials applied to the − and + conductors PL of the party-line by the selective metering relay set. The operation of the relay ML enables its mechanical locking arrangements to become effective so that it is held operated mechanically and is no longer dependent on the energization of its winding. Relay ML operating, at contacts ML1 first removes a short-circuit from the transmitter TR and then completes a short-circuit across itself and at contacts ML2 first removes a short-circuit from the digital impulse contacts IMP, and then completes a short-circuit across the code impulse springs CIMP thereby rendering them ineffective. It will be noted that a pair of rectifiers are connected in opposite senses across the handset receiver, in order to minimize the effect of any excessive surges when the dial off-normal contacts restore to their rest position.

Dialling of the required subscriber's number proceeds in the normal manner, the digital impulses being transmitted as disconnections of the loop, provided by way of the dial off-normal contacts DON1 and DON2, upon the actuation of the impulse contacts IMP. Upon termination of the call, restoration of the handset HS to its rest position on the cradle switch enables the mechanical locking arrangements to release the relay ML. Relay ML releasing, at contacts ML1 first removes a short-circuit from its winding, and then applies a short-circuit to the transmitter TR, and at contacts ML2 first removes the short-circuit from the code impulse springs CIMP and then re-applies a short-circuit to the impulse contacts IMP.

To answer an incoming call, a party-line subscriber upon hearing his particular code or ringing signal first removes the instrument handset from its rest position and then presses the push-button switch which then locks mechanically in the operated position. Push-button KA operating first removes the short-circuit from the transmitter TR and then completes a direct current loop on the − and + conductors PL by way of the transmitter TR. Conversation may now proceed.

Upon termination of the connection, the subscriber restores his handset to its rest position on the cradle switch this action enabling the mechanism linking the push-button and the cradle switch to become effective and so release the push-button so that it assumes its normal position.

Figure 4:
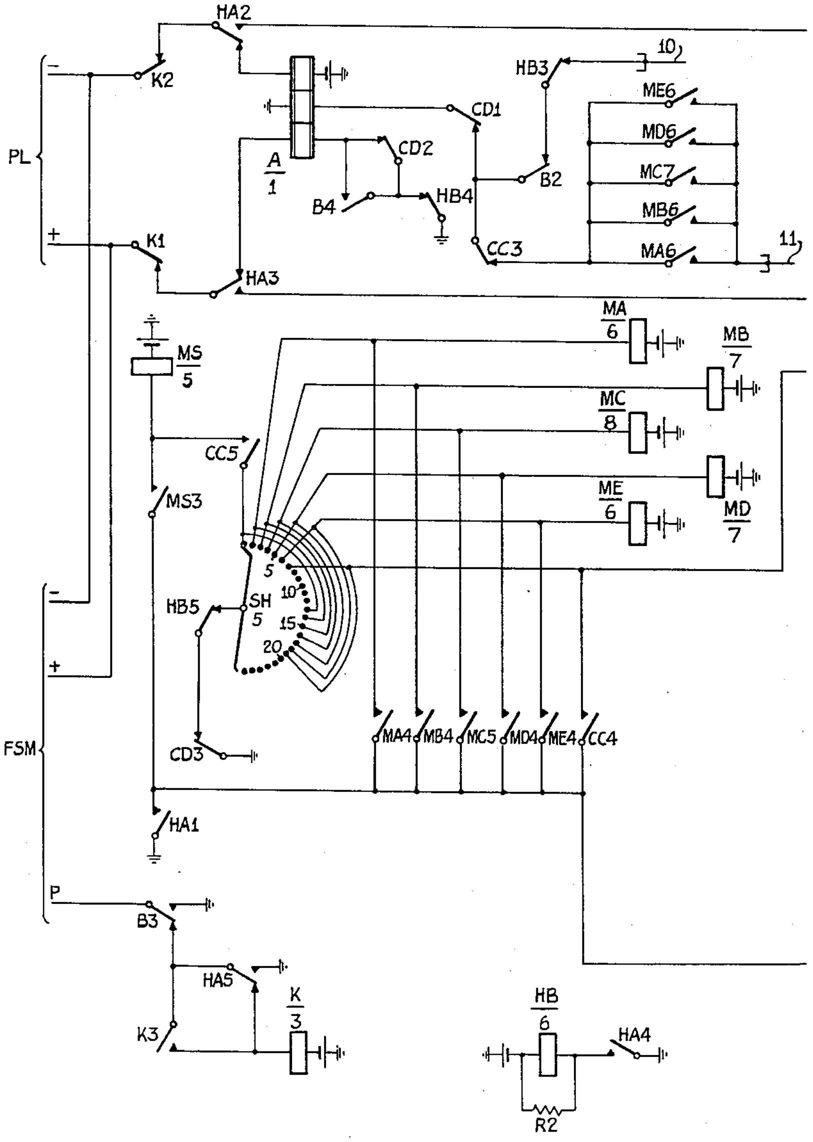
FIGS. 4 and 5 show the circuit of a selective metering relay set for party-line subscribers.
Figure 5:
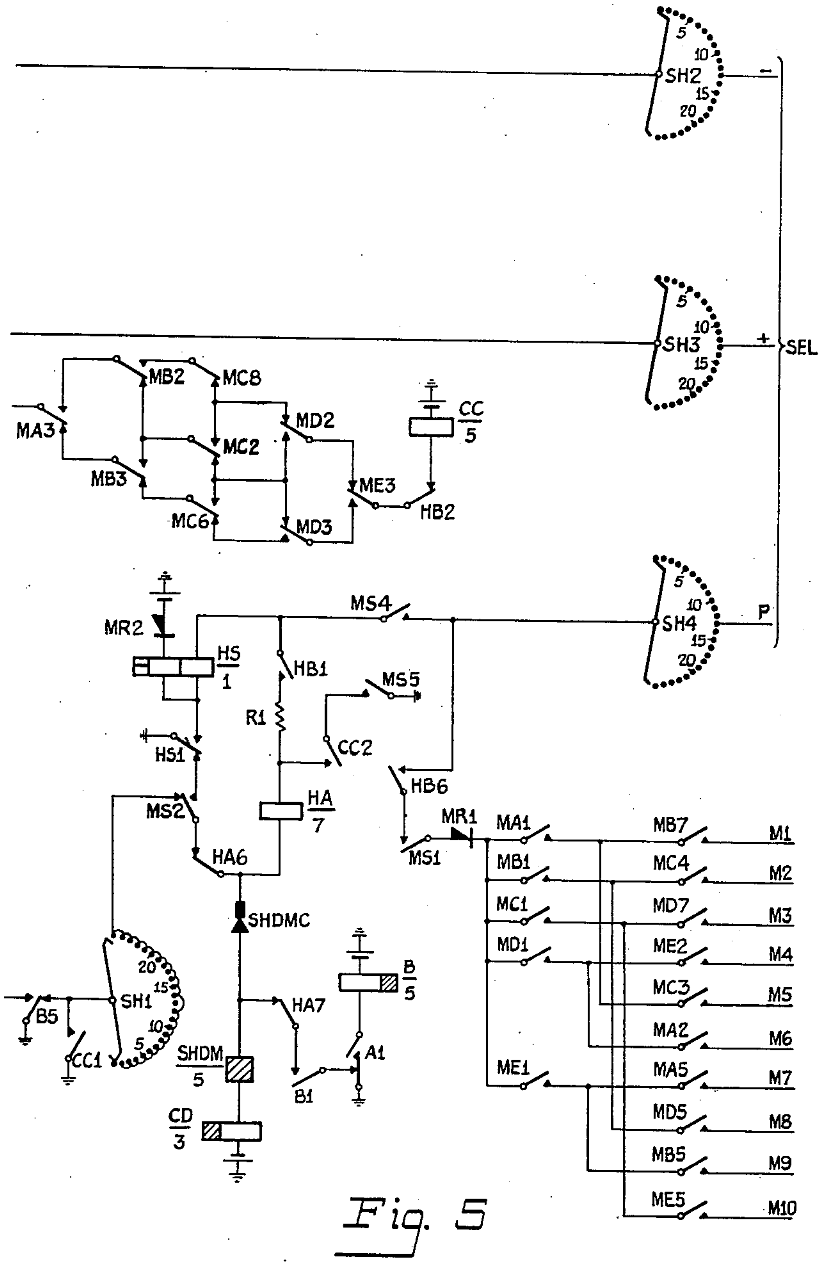

The operation of the selective metering relay set will now be described in detail, in conjunction with FIGS. 2, 4 and 5. As has been previously mentioned, a party-line subscriber when initiating a call listens first for dial tone in order to ascertain that the party-line is idle and for the purposes of description it will be assumed that party-line station number two has initiated a call. Dial tone is applied to the party-line PL from common lead 10 by way of contacts HB3, B2, CD1 and the middle winding of relay A to earth, the tone being induced into the outer windings of relay A to effect transmission to the calling party-line station. Having ascertained that the party-line is idle, the calling subscriber proceeds to dial the compulsory preliminary digit 0. This results in the transmission of a code impulse pattern which is characteristic of the calling party-line subscriber. This coding has a total complement of six impulses and is transmitted as loop-disconnections by the code impulse springs CIMP in the party-line subscriber's instrument. The spacing and grouping of these impulses for identifying each party-line subscriber is shown clearly in FIG. 3.

Upon the commencement of rotation of the dial finger plate, the dial off-normal contacts establish a loop condition on the party-line conductors − and + PL, thereby causing relay A to operate over its outer windings. Relay A operating, at contacts A1 operates the slow-to-release relay B, which at contacts B1 prepares a point in an energizing path for the selector hunter driving magnet SHDM, and at contacts B2 disconnects the dial tone on common lead 10 from the middle winding of relay A. Contacts B3 connect a busying earth to the P bank contact of the final selector multiple FSM, and contacts B5 prepares a point in the holding path for the coding relays, namely relays MA, MB, MC, MD and ME, and also the code checking relay CC. No further change takes place in the selective metering relay set until the impulses forming the code impulse pattern are received.

The calling subscriber having rotated the dial finger plate in accordance with the compulsory preliminary digit, now releases the finger plate, which then commences to restore to its rest position. Accordingly the first disconnection of the loop by the "breaking" of the code impulse springs CIMP (FIG. 2) as a result of actuation by the code cam, enables relay A to release, whereupon contacts A1 energize the selector hunter driving magnet SHDM in series with the slow-to-release relay CD, thereby causing relay CD to operate. It is to be noted that the slow-to-release characteristic of relay B is sufficient to ensure that it remains operated while relay A is responding to code impulses or digital impulses, contacts B4 maintaining earth from contacts HB4 on the lower winding of relay A when relay CD is operated.

When relay A re-operates at the end of the first code impulse, the energizing path of the series-connected selector hunter driving magnet SHDM and relay CD is broken, and therefore the selector hunter wipers are enabled to take one step. At this time relay CD remains operated, but in its slow-to-release period. If, before relay CD has time to release, a further coding impulse causes relay A to respond, contacts A1 enable the selector hunter to take a further step, and also re-energize the winding of relay CD for the period for which the contacts A1 are released.

Assuming for the purposes of description that the first two coding impulses relevant to subscriber number two have been received, and that the selector hunter uniselector had just stepped on to contact three and that relay CD is in its slow-to-release delay period. As no further code impulses are received before relay CD reaches the end of its slow-to-release delay, it releases, whereupon contacts CD3 complete the circuit, by way of contacts HB5 and wiper SH5, to operate relay MB. Relay MB operating, at contacts MB1, MB5 and MB7 prepares points in paths to the leads M2, M9 and M1 respectively, and at contacts MB2 and MB3 prepares points in the path to relay CC. Contacts MB4 complete a holding path for relay MB to the earth at contacts B5. No further changes take place in the relay set until the reception of the next impulse of the code impulse pattern.

Upon the reception of the next code impulse, relay A is once again caused to respond, thereby energising the selector hunter driving magnet SHDM and re-operating relay CD, which at contacts CD1, disconnects a point in the path to the middle winding of relay A, and at contacts CD3 disconnects the original operating earth of relay MB. At the end of the code impulse the energising path of the selector hunter driving magnet SHDM and relay CD is disconnected, whereupon the selector hunter steps on to contact 4 and relay CD is disconnected.

As the calling subscriber is number two on the party-line it can be seen from FIG. 3 that only a single code pulse is received at this time and therefore relay CD will release at the end of its delay period. Relay CD releasing, at contacts CD3 completes the circuit to operate relay MC over the contacts HB5, wiper SH5, and bank contact 4. Relay MC operating, at contacts MC1, MC3 and MC4 prepares further points in the paths to the leads M3, M5 and M2 respectively, and at contacts MC2, MC6 and MC8 prepares further points in the path to relay CC. Contacts MC5 provide a holding circuit for relay MC to the earth at contacts B5. It is to be noted that various contacts of relays MB and MC have been mentioned as preparing points in paths to various leads in the leads M1 to M10 but the only direct path established from rectifier MR1 to one of the leads M1 to M10 is that for lead M2 by way of the contacts MB1 and MC4, the lead M2 extending to the meter of party-line subscriber number two.

Upon the reception of the last portion of the subscriber identifying code, in this case, three consecutive impulses, the first impulse will cause relay CD to operate and therefore it will remain operated until the third impulse has been received. The response of relay A to the three impulses enables the selector hunter to step on to contact seven and consequently when relay CD releases at the end of its slow-to-release period, contacts CD3 complete the circuit to operate relay CC over contacts HB5, wiper SH5, contacts MA3, MB3, MC2, MD2, ME3 and HB2. Relay CC operating, at contacts CC1 completes a self-interrupted energising path for the selector hunter driving magnet SHDM, by way of wiper SH1, contacts MS2, HA6 and interrupter contacts SHDMC. Contacts CC1 also enable relay CD to re-operate. Contacts CC3 disconnect a further point in the path from common lead 11 to the middle winding of relay A, and contacts CC4 complete a holding circuit for relay CC to the earth at contacts B5. Further, contacts CC5 prepare a point in the path to relay MS from bank contacts one and thirteen of wiper SH5. It can be seen from the circuit arrangements of relay CC that if only one, or more than two, of the code relays MA to ME is or are operated, then relay CC is unable to operate and contacts CC3 enable the number unobtainable tone on common lead 11 to be applied to the party-line.

At this juncture it is convenient to list the various coding relays which are operated by different subscribers' stations on the party-line, and these are given in the table below:

| Party-line subscriber's station number: | Code relays operated after dialling preliminary digits |
|---|---|
| 1. | MA and MB |
| 2. | MB and MC |
| 3. | MC and MD |
| 4. | MD and ME |
| 5. | MA and MC |
| 6. | MA and MD |
| 7. | MA and ME |
| 8. | MB and MD |
| 9. | MB and ME |
| 10. | MC and ME |

The foregoing table represents the response of the coding relays to the ten impulse patterns transmitted individually by dialling the preliminary digit 0 from a party-line having ten subscribers. Each of the ten impulse patterns when transmitted is effective in causing a distinctive 2-out-of-5 registration to be set up on the coding relays of the selective metering relay set, each registration being represented by the operation of a different pair of relays in the coding relays. It will be appreciated that the particular registration is determined by that portion of the impulse pattern up to the end of the second long break period, the number of break periods and the relative positions of the long make periods serving to define the subscriber which happens to be calling. In all cases however, each impulse pattern comprises a total of six break periods and all six periods are utilised to finally position the uniselector at a point which is common to all patterns so that a check may be made to ascertain that neither more nor less than two coding relays have been operated. From this it can be seen that the dial switch in effect transmits a form of 2-out-of-5 coding with a facility for ensuring checking of the registered code.

When the selector hunter has self-driven as far as contact thirteen on wiper SH1, the self-driving circuit is broken and consequently rotation of the wipers ceases. With the disconnection of the self-drive circuit, the slow-to-release relay CD is also caused to release. Upon releasing, relay CD, at contacts CD3 completes the circuit to operate relay MS, by way of contacts HB5, wiper SH5 (bank contact 13), and contacts CC5. Relay MS operating, at contacts MS2 completes a self-interrupted driving circuit for the selector hunter driving magnet SHDM from the earth at contacts HS1, at contacts MS3 completes a self-holding path to the earth at contacts B5, and at contacts MS4 connects the high-speed testing relay HS to the wiper SH4. Contacts MS5 provide a short-circuit on relay HA by way of contacts CC2. Contacts MS2 also enable relay CD to reoperate but it performs no significant circuit function at this time.

The wipers of the selector hunter are now searching automatically over the bank contacts for an idle succeeding selector, the indication of this condition being a −100 v. potential on the P bank contact SEL. A busy selector is indicated by the presence of earth. Thus when the wiper SH4 is rotated over the bank contacts, rectifier MR2 prevents relay HS responding to the busying earth condition. However, when wiper SH4 encounters the first −100 v. potential on a P bank contact SEL, indicating an idle selector, relay HS is enabled to operate over its windings in series, contacts HS1 halting the rotation of the wipers of the selector hunter and also removing the short-circuit from relay HA. Relay HA operates in series with the selector hunter driving magnet SHDM and the winding of relay CD, although under this condition relay CD is unable to remain operated and therefore releases after a delay without performing any useful function at this time. Contacts HS1 operating also connect an immediate guarding earth to the relevant P bank contact SEL, by way of the low-resistance right-hand winding of relay HS.

Relay HA operating, at contacts HA1 provides a further holding earth for relays MB, MC, CC and MS, at contacts HA2 and HA3 first disconnects the outer windings of relay A from the party-line − and + conductors PL and then extends the latter to the wipers SH2 and SH3 respectively, and at contacts HA4 enables relay HB to operate. Contacts HA6 disconnect a further point in the original self-driving path of the selector hunter, while contacts HA7 disconnect a point in the original stepping path of the selector hunter. Relay HB operating, at contacts HB1 prepares a point in the holding circuit of relay HA, at contacts HB2 breaks the holding path of relay CC which thereupon releases, and at contacts HB3 breaks a further point in the path from common lead 10 to the middle winding of relay A. Contacts HB5 disconnect a point in the path to wiper SH5, and contacts HB6 complete the circuit from wiper SH4 to lead M2 in preparation for the application of metering pulses to the meter of subscriber number two.

As a result of contacts HA2 and HA3 extending the − and + conductors PL to the wipers SH2 and SH3 respectively, the relay A is caused to release while the succeeding selector is thereupon seized by the loop applied to the − and + conductors PL by the calling subscriber. The succeeding selector in responding to the seizure condition immediately applies a guarding and busying earth to its associated P bank contact SEL, thereby guarding the selector against intrusion by other searching selector hunters. This busying earth causes relay HS to release, but it does not perform any useful function at this time.

The release of relay CC, at contacts CC2 makes the holding of relay HA dependent on the earth applied to the P bank contact SEL of the seized succeeding selector. Relay A releasing, at contacts A1 disconnects the slow-to-release relay B, which thereupon releases after a delay. Relay B releasing, at contacts B1 disconnects a further point in the original stepping circuit of the selector hunter, at contacts B3 makes the busying of the P conductor FSM dependent on the earth provided by contacts HA5, and at contacts B5 makes the holding of relays MB, MC and MS dependent on contacts HA1.

The calling party-line subscriber is now receiving a second dial tone which is supplied from the seized succeeding selector, the connection through the selective metering relay set being fully established with the following relays therein operated, namely relays HA, MB, MC, MS and HB. It is to be noted that relay HA is maintained operated in series with resistor R1, the selector hunter driving magnet SHDM and the winding of relay CD, to the earth applied to the P bank contact SEL.

The calling subscriber may now set up the desired connection in the usual manner, and consequent upon the called party answering a positive battery metering pulse or pulses is applied, by the final selector employed in the connection, to the P bank contact SEL. The positive battery pulse, or pulses, are effective in operating the meter of party-line subscriber number two by way of rectifier MR1, contacts MB1, MC4 and lead M2.

When the conversation is terminated and the subscribers clear, earth is removed from the P bank contact SEL so that relay HA releases. The release of relay HA, at contacts HA1 breaks the holding circuit of relays MS, MB and MC, which all therefore release, at contacts HA2 and HA3 first disconnects the through path of the party-line conductors PL and then connects the party-line conductors to the outer windings of relay A, and at contacts HA4 causes relay HB to release after a slight delay due to the effect of resistor R2. Contacts HA5 first remove the busying earth from the P conductor FSM and then complete the path from relay K to the P conductor FSM, and contacts HA6 prepare a point in the self-interrupted drive circuit of the selector hunter. Redays MB and MC releasing, at contacts MB1 and MC4 respectively, disconnect the path to lead M2. Relay MS releasing, at contacts MS1 disconnects the path from wiper SH4 to leads M1 to M10, at contacts MS4 disconnect a further path from wiper SH4 to the series-connected windings of relay HS, and at contacts MS2 completes the self-interrupted homing circuit for the selector hunter, over the path earth, contacts B5, wiper SH1, contacts MS2, HA6, interrupter contacts SHDMC to battery through the selector hunter driving magnet SHDM and the winding of relay CD.

With the energization of the driving magnet SHDM relay CD is also enabled to operate, whereupon, contacts CD1 prevents any tones being applied to the middle winding of relay A, while contacts CD2 prevent relay A being re-operated should a party-line subscriber apply a loop to the party-line before the selective metering relay set has released fully from the present call. Relay HB releasing at this time does not perform any significant circuit function.

The self-interrupted drive of the selector hunter continues until the first of the two home contacts, namely contacts one and thirteen, is encountered by wiper SH1, whereupon the drive circuit is disconnected and rotary movement of the wipers ceases. At the same time the winding of relay CD is disconnected, and therefore it releaeses after a delay. Relay CD releasing restores the selective metering relay set to normal and it is now available for use on other calls.

A call incoming to a party-line subscriber will now be described. The idle condition of the party-line is indicated by the fact that negative battery (−50 v.), by way of the winding of relay K, is present on the P conductor of the final selector multiple FSM. The final selector concerned with the incoming call switches to this condition, and as a result relay K in selective metering relay set is enabled to operate. Relay K operating, at contacts K1 and K2 disconnects the + and − conductors PL respectively from the outer windings of relay A, and at contacts K3 completes a self-holding path to the busying earth applied to the P conductor FSM by the final selector concerned with the incoming call. The appropriate ringing signal may now be applied by the final selector to the party-line by way of the − and + conductors FSM.

When the call is terminated the busying earth applied by the final selector to the P conductor FSM is removed, and accordingly relay K is enabled to release. The release of relay K restores the selective metering relay set to normal once again and it is now ready for use on another call.

I claim:

1. In an automatic telephone exchange, at least one party line, meters at the exchange, one for each party on said party line, a dial switch at each party-line subscriber's station arranged on a preliminary operation which is the same for all parties on said party line to transmit a characteristic impulse pattern identifying the calling party-line subscriber's station, said impulse pattern comprising three series of impulses, the total number of impulses in the three series being the same for all parties on the party-line and the separations between adjacent series being equal and the same for all parties on the party line, a plurality of coding relays at the exchange, means at the exchange responsive to the first and second impulse series for operating two of said coding relays to select the meter relevant to the calling party and means at the exchange responsive to the operation of two of said coding relays and the reception of a number of impulses equal to said total number for extending the party line through a non-numerical switching stage.

2. An automatic telephone exchange as claimed in claim 1 including first and second sets of impulsing contacts on said dial switch, means responsive to said preliminary operation of said dial switch for controlling said first set of impulsing contacts to transmit said characteristic impulse pattern, a switching device at said calling party line subscriber's station, means responsive towards the end of the transmission of said characteristic impulse pattern for operating said switching device and means responsive to the operation of said switching device for disconnecting said first set of impulsing contacts and connecting up said second set of impulsing contacts to enable digital impulses to be transmitted by subsequent operation of the dial switch.

3. An automatic telephone exchange as claimed in claim 1 wherein said first-mentioned means comprise a uniselector having access over one of its wipers to said coding relays and over other wipers to dial-switch-controlled selectors.

4. An automatic telephone exchange as claimed in claim 3 and including a drive magnet for said uniselector, means for applying said three impulse series to said magnet to enable a check to be made and means effective if the check is satisfactory for conditioning the uniselector to hunt for an available outlet.

References Cited in the file of this patent

UNITED STATES PATENTS

| | | |
|---|---|---|
| 2,013,171 | Peterson | Sept. 3, 1935 |
| 2,043,674 | Obergfell | June 9, 1936 |
| 2,623,125 | Lomax | Dec. 23, 1952 |
| 2,890,287 | Goldschmidt | June 8, 1959 |